Feb. 6, 1968
W. B. ROBBINS
3,367,304
DEPOSITION CHAMBER FOR MANUFACTURE OF
REFRACTORY COATED FILAMENTS
Filed March 13, 1967
3 Sheets-Sheet 1
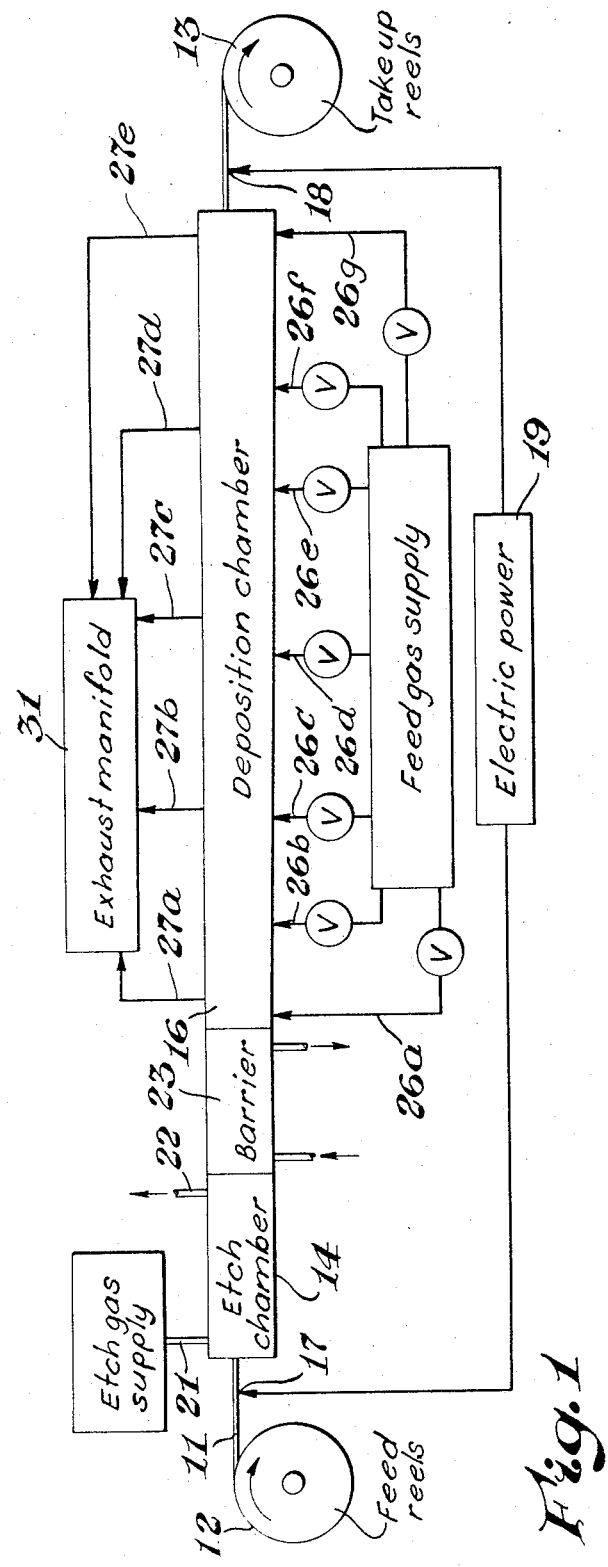
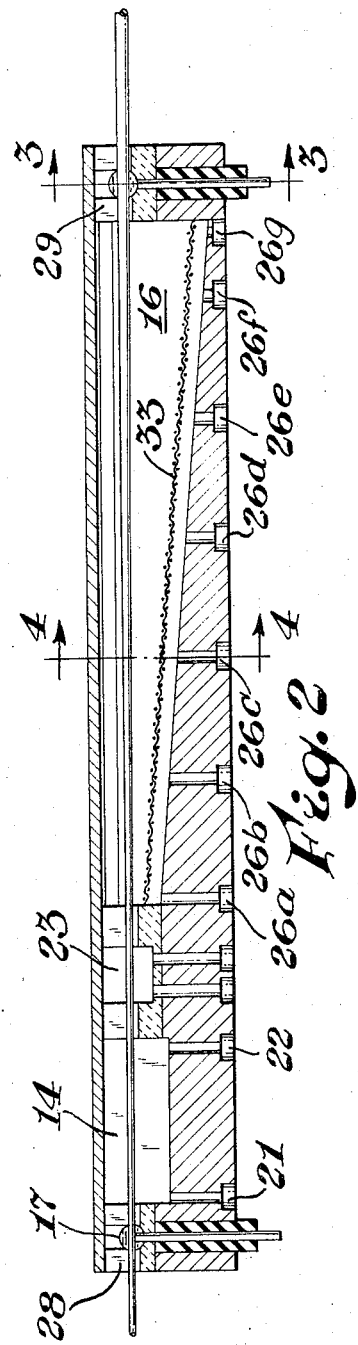
INVENTOR.
William B. Robbins
BY
Howard W. Herman
ATTORNEY

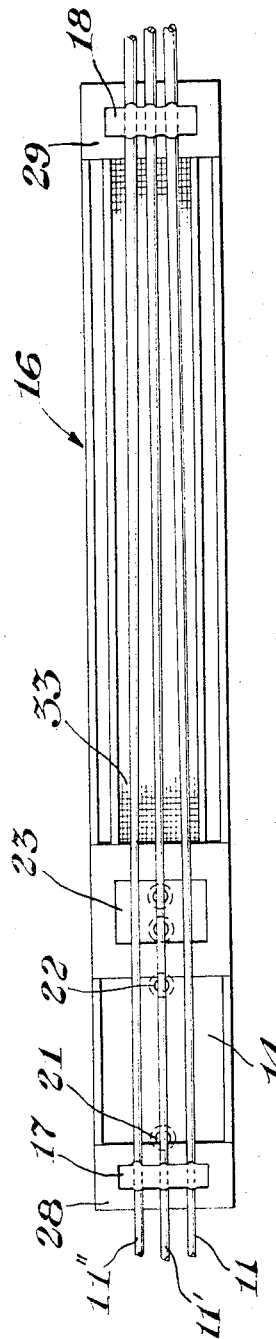
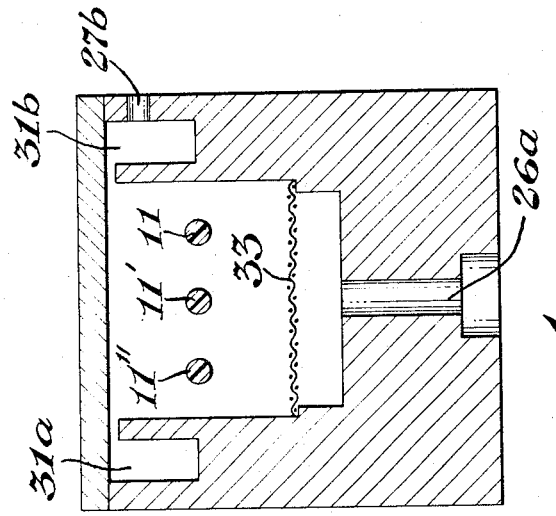
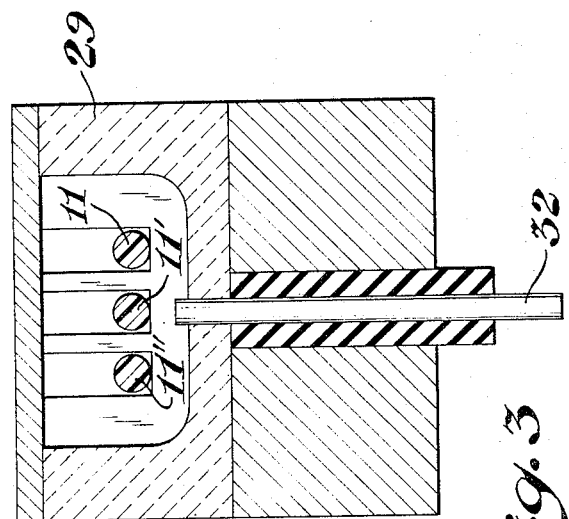

United States Patent Office 3,367,304
Patented Feb. 6, 1968

3,367,304
DEPOSITION CHAMBER FOR MANUFACTURE
OF REFRACTORY COATED FILAMENTS
William B. Robbins, Midland, Mich., assignor to Dow
Corning Corporation, Midland, Mich., a corporation of
Michigan
Filed Mar. 13, 1967, Ser. No. 622,596
6 Claims. (Cl. 118—49.5)

ABSTRACT OF THE DISCLOSURE

Chamber for coating filamentary materials by gaseous reaction or deposition. The chamber is elongated in direction of filament travel and is designed to keep a constant temperature gradient at the filament surface through the chamber. This is accomplished by varying the spacing of adjacent filaments along the length of the chamber, varying the cross-sectional area of the chamber along its length, and/or varying the velocity of feed gas along the length of the chamber to compensate for changing surface area of the filament as coatings build upon on the filament surface.

Background of the invention

The present invention relates to the coating of fibers or filaments with refractory materials and particularly to improved apparatus for use in continuous filament coating processes.

It has heretofore been proposed that high strength filaments may be formed by coating fine filaments with high strength materials such as boron and silicon carbide. The substrate filament in such case plays little if any role in the performance of the final filament. Composite filaments formed in this manner have a high strength-to-weight ratio and are particularly useful as reinforcing materials for plastics, metals and the like.

Perhaps the simplest prior art method for producing composite filaments having refractory coatings has been by heating the substrate filament to a temperature sufficiently high to cause reaction and deposition from raw materials in the vapor phase. The heating of the filament is generally carried out by utilizing an electrically conductive substrate filament such as tungsten or carbon and providing electrical contacts along the length of the filament to provide resistive heating.

A problem inherent in this technique is the fact that the filament increases in diameter and surface area along its length as the coating is applied. Hence, the surface temperature of the filament tends to decrease as the filament passes through the chamber. Additionally, the refractory coating generally has a different electrical resistance from that of the substrate filament; and, therefore, may change the amount of heat generated at different points along the filament. A further problem is that while the filament is cleaned prior to introduction into the growth chamber, it is recontaminated by an electrical contact positioned at the entrance to the growth chamber.

The deposition chamber in most prior art systems is an elongated cylinder having a uniform cross-section and having a filament inlet and a filament outlet both located substantially axially with respect to the cylinder. Near one end of the cylinder there is provided a reaction gas inlet, and near the other end there is provided a reaction gas outlet. Since the reaction gas entering the chamber is seldom at the same temperature as the filament within the chamber, excessive thermal gradients are produced at or near the inlet creating more uneven heating of the fiber. Gases passing through the chamber change temperature along the length of the chamber, again creating more uneven heating effects. Reaction gases fed substantially axially through the chamber tend to become laminar and stagnate at the filament surface, thus creating inefficient deposition and again adding to temperature problems. If the reactant gas outlet is positioned on the cylindrical surface of the reaction chamber, a stagnation effect in the reaction gas occurs near the filament outlet creating increased temperature at that point. As the filament leaves the reaction chamber, it is abruptly cooled and the added temperature caused by the stagnation aggravates the thermal shock received by the filament and tends to lessen the quality of the filament. Variations in surface temperature and thermal shocks created along the filament, as well as the stagnation effects of reaction gas in the chamber, also tend to reduce the quality of the fiber.

Summary of the invention

By the present invention there is provided coating apparatus which eliminates or reduces, as far as possible, changes in surface temperature of the filament as it passes through a deposition chamber. Basically, this is accomplished in accordance with the invention by increasing the cross-section of the chamber and the distance from the filament to the chamber walls along the length of the chamber, by introducing reaction gases into and exhausting spent gases from the chamber at numerous points and possibly at different velocities, and/or by varying the spacing between adjacent filaments in a multi-filament chamber. Additionally, means are provided for preventing build up of by-products and spent reaction gases and for eliminating stagnation of the reaction gas anywhere along filament lengths. Baffling means are provided in the chamber for prevention of stagnation. Additionally, in order to clean the filament surface, an etching chamber is provided ahead of the deposition chamber and isolated therefrom. Further, in order to prevent contamination of the clean filament, no electrical contact is made with the filament between the etch and deposition chambers.

Other objects and attendant advantages of the present invention will become obvious to those skilled in the art from a consideration of the following detailed description when read in conjunction with the accompanying drawing.

Brief description of the drawing

FIGURE 1 is a diagrammatic view of coating apparatus made in accordance with the present invention;

FIGURE 2 is a view in vertical cross-section of the deposition chamber and each chamber shown diagrammatically in FIGURE 1, the section being taken along a path of filament travel;

FIGURE 3 is a view in cross-section taken along the line 3—3 of FIGURE 2 with the liquid material removed;

FIGURE 4 is a view in cross-section taken along the line 4—4 of FIGURE 2;

FIGURE 5 is a top view of the chamber of FIGURE 2 with the cover removed; and

Description of the preferred embodiments

Figure 6:
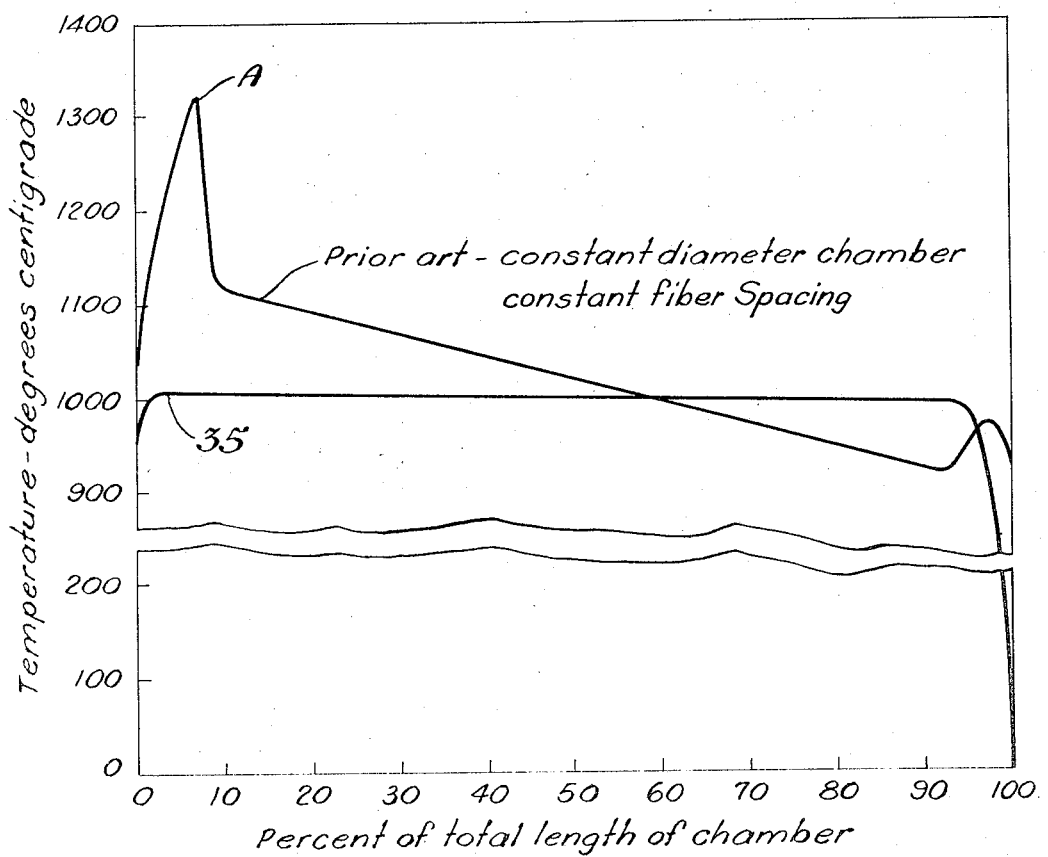
FIGURE 6 is a graph illustrating the temperature variation in the deposition chamber shown in FIGURES 1–5 and comparing the same to a cylindrical constant diameter prior art chamber.

Referring now to the drawings wherein like reference characters designate like or corresponding parts throughout the figures thereof, there is shown in FIGURE 1 a filament, or filaments, 11 passing from a feed reel 12 to a take-up reel 13. The filament first passes through an etch chamber 14 where it is cleaned and then through an elongated deposition chamber 16 wherein the coating is applied. A pair of electrical contacts 17 and 18 are positioned at the entrance of the etch chamber and the exit of the deposition chamber to provide contact to the filament for passing an electrical current from a power source 19 to cause the filament to be heated along its length. The etch chamber is also provided with a fluid inlet 21 for supplying etch gases to the chamber and a fluid outlet 22 for exhausting spent etch gases from the chamber. A barrier chamber 23 is positioned between the etch chamber and the deposition chamber along the path of filament travel. The barrier chamber has means associated therewith for passing inert gas into and out of the chamber in order to prevent etch gases from entering the deposition chamber and to prevent premature deposition from an improper gas mixture. The deposition chamber 16 which will be described in detail hereinafter is of increasing cross-sectional area in the direction of filament travel to the chamber. The chamber is provided with a plurality of feed gas supply inlets 26a–g and a plurality of exhaust outlets 27a–e. For drawing simplicity a relatively small number of inlets and outlets are shown. One of the inlets 26a is positioned as closely as possible to the point of entry into the deposition chamber to prevent eddying effects and related thermal shock in this area. Preferably, valves for controlling flow velocity are provided on each inlet.

Referring now to FIGURE 2, further details of the etch chamber 14 and deposition chamber 16 may be seen from the cross-sectional view. The electrical contracts 17 and 18 are each preferably a pool of mercury or amalgam housed in an insulating body 28, 29, respectively. As may be seen more clearly from FIGURE 3, the insulating body 29, for example, is provided with a plurality of slots through which the filaments 11, 11' and 11" may pass. The slots are sufficiently narrow to prevent the mercury or amalgam from passing out of the contact area due to inherent surface tension. The pool of mercury or amalgam lies in a hollowed out central portion of the insulated block, as may be seen also from FIGURE 5, and is electrically connected by means such as an insulated wire 32 to the electrical power source 19, as shown in FIGURE 1.

The deposition chamber 16 is shown as having a uniformly tapered cross-section increasing in the direction of filament travel. It will be realized, of course, that the cross-section may be increased step wise or non-linearly without departing from the scope and spirit of the present invention. As may be seen more clearly from FIGURES 4 and 5, a screen baffle 33 is provided along the entire length of the deposition chamber over the gas inlets 26a–g. Although for drawing simplicity only a single layer of screening is shown, it should be realized that additional screening layers provide better baffling. The baffles along with the position of the multiplicity of inlets prevent stagnation and control flow velocity the entire length of the filament. To further improve gas flow, there is also provided a continuous exhaust duct 31a, 31b at each side of the chamber, the ducts each being provided with exhaust outlets 27a–e of FIGURE 1. The purpose of the tapered deposition chamber is to provide a constant surface temperature along the entire length of the filament which is within the chamber. Due to the increasing surface area of the filament as it passes through the chamber, greater amounts of heat are removed by the gas per unit length of the filament, thus moving the walls farther away from the filament surface compensates for the increased heat loss by providing a longer gas path through which the heat must travel before reaching the thermally conductive chamber walls. Similarly, the surface temperature of the filament may be maintained constant by varying the velocity of reaction gases along the length of the chamber. This is accomplished by varying the spacing between gas inlets. Additional control of the temperature gradient may be obtained by varying the spacing between adjacent filaments along the length of the chamber allowing heating of the filaments by one another to compensate for increase in surface area. This may be observed from FIGURE 5. Any or all of these controlling factors may be utilized in any embodiment of the invention.

In operation, electric power from the source 19 is provided by contacts 17 and 18 to the filaments 11, 11', and 11" causing the filaments to be heated in the etch chamber 14, barrier 23 and deposition chamber 16. An etching gas such as, for example, $H_2$ is passed through the chamber causing the filament surfaces to be cleaned and roughened. The choice of etching gases, of course, depends upon the filament material and the substance which is to be deposited on the filament.

The filaments then pass through the barrier area 23 and into the deposition chamber 16. In order to deposit silicon carbide on the filaments, the filament surface is heated to at least about 1000° C. in order to decompose a gas mixture such as dimethdichlorosilane and hydrogen, which are fed into the chamber through the feed gas inlets 26a–g. Similarly, if boron is to be deposited, the gas may be, for example, borontrichloride or a boronhydride; and the filament must be heated to temperature between about 600° C. and 1000° C. It is to be noted that the temperature necessary for deposition is the temperature which the surface of the filament or filament coating must reach. The barrier 23 functions by passing an inert gas into and out of the barrier chamber at sufficiently high velocity to pull in gases from the etch chamber and deposition chamber by the Venturi effect. The barrier gas may be, for example, argon.

In FIGURE 6 there is shown a comparison of the filament surface temperature along the length of a uniform diameter cylindrical chamber having a reactant gas inlet and exhaust positioned on the cylindrical surface of the chamber near the ends thereof. It will be noted that the line representing the contant diameter chamber has near the entrance length of the chamber a peak A caused by stagnation of reactant gases near the point of entry of the filament into the chamber, and a second peak B near the exit of the chamber caused by similar stagnation at this point. Between the two peaks, the surface temperature of the filament has a substantially constant decrease per unit length, assuming a substantially constant increase in surface area due to deposition. Utilizing the tapered chamber concept and/or varying flow velocities, filament spacings, and filament-to-wall spacings, in accordance with the present invention, a substantially constant filament surface temperature such as that indicated by the line 35 of FIGURE 5 may be provided.

Obviously, modifications and variations of the invention described herein will become obvious to those skilled in the art; therefore, it is to be understood that within the scope of the appended claims, the invention may be practiced otherwise than as specifically described.

1. In apparatus for continuously coating filamentary materials by gaseous reaction or decomposition, said apparatus comprising an elongated deposition chamber, means for feeding gaseous raw materials into said chamber, means for exhausting gases from said chamber, means for feeding a plurality of said filamentary materials through said chamber in the direction of elongation, electrical contact means for heating said plurality of filamentary materials, means spacing said filamentary materials a greater distance apart at the entrance end of said chamber than at the exit end of said chamber, a plurality of feed gas inlets spaced along the length of said chamber, thereby providing means for controlling turbulence and velocity of gases past said filamentary materials in the chamber, further means for controlling turbulence and velocity comprising baffle means within said chamber, and said chamber having a gradually increasing cross section along its length from the point of entry of said filamentary materials to the point of exit of said filamentary materials.

2. Apparatus as defined in claim 1 wherein said baffle means comprises:
a screen member positioned over said feed gas inlets.

3. Apparatus as defined in claim 2 and further including
an etching chamber mounted along the path of said filamentary materials in proximity to the point of entry of said filamentary material into said deposition chamber,
said etching chamber having gas inlet and exhaust means.

4. Apparatus as defined in claim 3 and further comprising
a barrier chamber interposed between said etching chamber and said deposition chamber to prevent contamination of the filament by any electrical contact at this point.

5. Apparatus as defined in claim 1 wherein
said plurality of feed gas inlets are spaced along the length of said deposition chamber at non-uniform distances.

6. In apparatus for continuously coating filamentary materials by gaseous reaction or decomposition, said apparatus comprising an elongated deposition chamber, means for feeding gaseous raw materials into said deposition chamber, means for exhausting gases from said deposition chamber, means for feeding a plurality of said filamentary materials through said deposition chamber in the direction of elongation, and electrical contact means for heating said filament in said chamber, the improvement which comprises:
said deposition chamber having a gradually increasing cross-section along its length from the point of entry of said filamentary materials into said chamber to the point of exit of said filamentary materials from said chamber and means spacing said filamentary materials greater distance apart at the entrance end of said chamber than at the exit end of said chamber.

References Cited

UNITED STATES PATENTS

| | | | |
|---|---|---|---|
| 2,489,127 | 11/1949 | Forgue | 118—480 XR |
| 2,656,283 | 10/1953 | Fink et al. | 118—48 X |
| 2,867,552 | 1/1959 | Homer | 117—107.1 X |
| 2,877,138 | 3/1959 | Vodonik | 118—49.1 X |
| 2,887,984 | 5/1959 | Drummond | 118—48 |
| 2,896,570 | 7/1959 | Nack et al. | 117—107.1 X |
| 2,916,398 | 12/1959 | Mavin | 117—107.1 X |
| 2,938,821 | 5/1960 | Nack | 117—107.1 X |
| 3,083,550 | 4/1963 | Averbach | 117—107.2 X |

FOREIGN PATENTS

| | | |
|---|---|---|
| 394,830 | 5/1924 | Germany. |
| 722,866 | 2/1955 | Great Britain. |

MORRIS KAPLAN, *Primary Examiner.*